United States Patent [19]
Caregnato

[11] Patent Number: 5,634,159
[45] Date of Patent: May 27, 1997

[54] INTERFERENTIAL MULTISTEREOSCOPIC CAMERA WITH THREE-DIMENSIONAL EFFECT

[76] Inventor: Paolo Caregnato, Via Venturelli 2, 37128 Verona, Italy

[21] Appl. No.: 655,203

[22] Filed: May 28, 1996

Related U.S. Application Data

[63] Continuation of Ser. No. 194,966, Feb. 14, 1994, abandoned.

[30] Foreign Application Priority Data

Feb. 26, 1993 [IT] Italy .................................. VR93A0016

[51] Int. Cl.$^6$ .............................. G02B 3/00; G03B 35/00
[52] U.S. Cl. .............................. 396/327; 359/30; 359/737
[58] Field of Search ...................................... 354/110, 112, 354/114, 115, 117, 120; 359/9, 10, 22, 23, 30, 737; 396/324, 326, 327, 333

[56] References Cited

U.S. PATENT DOCUMENTS 3,995,288 11/1976 Yeuick .................................. 354/120 X Primary Examiner—Safet Metjahic
Assistant Examiner—J. K. Han
Attorney, Agent, or Firm—Guido Modiano; Albert Josif

[57] ABSTRACT

Camera provided with a lens, a diaphragm and a photographic film or plate arranged behind the diaphragm and located on a plane which is normal to the optical axis of the lens. The lens comprises: at least two light inlets; a doublet or triplet for each light inlet, suitable for collimating the incoming light and for correcting any aberrations; and a merging system, suitable for merging the homologous light rays which leave the doublets or triplets before they reach the photographic film. The photographic film or plate is a high-resolution film.

11 Claims, 3 Drawing Sheets

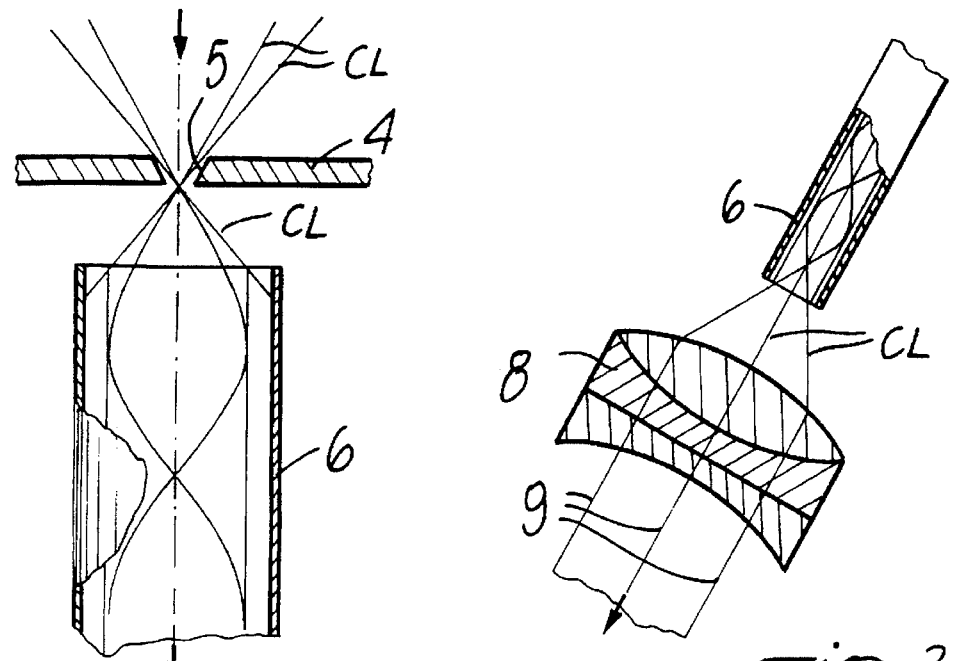
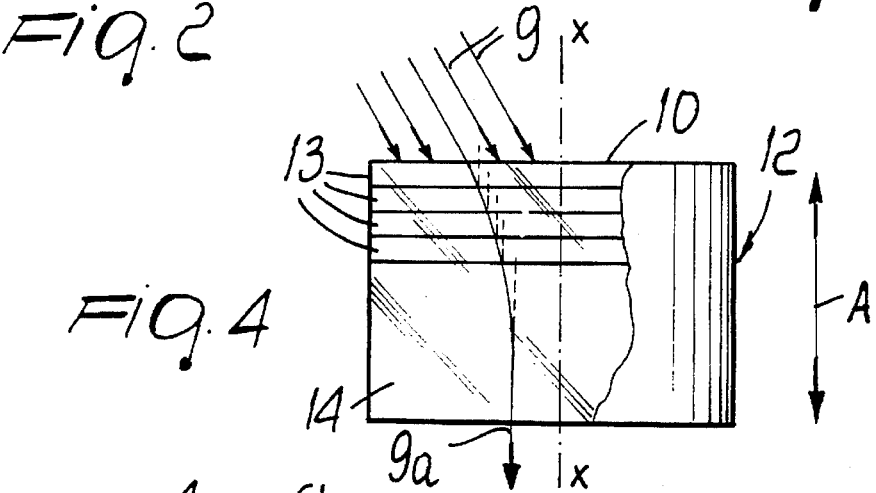
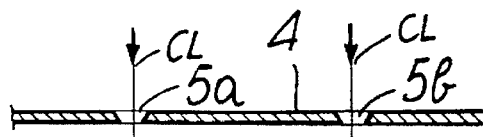
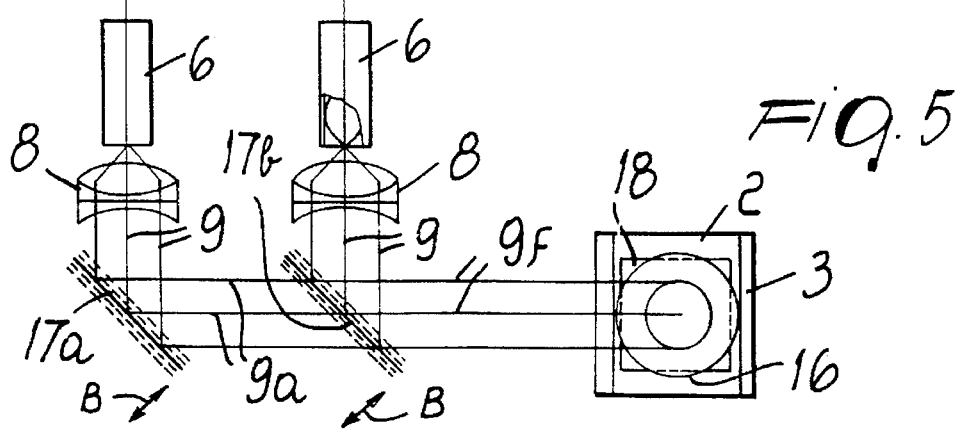

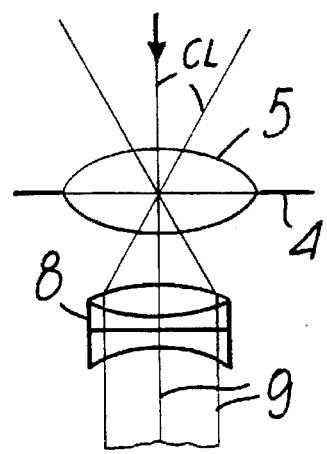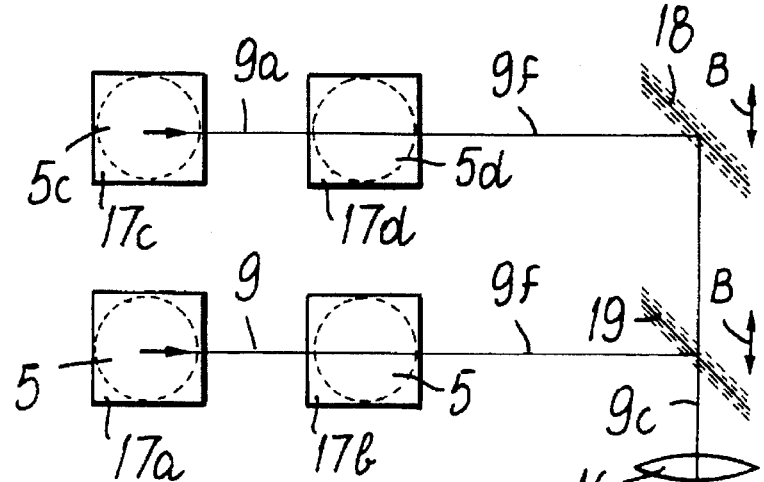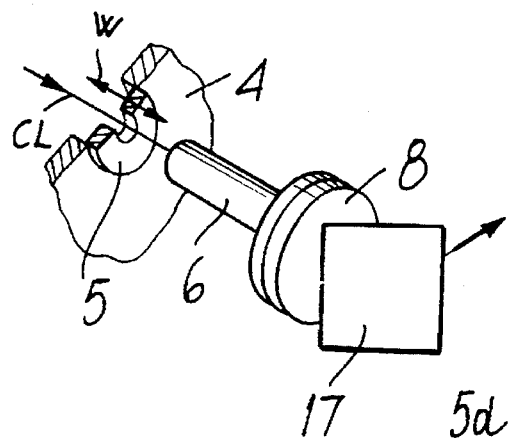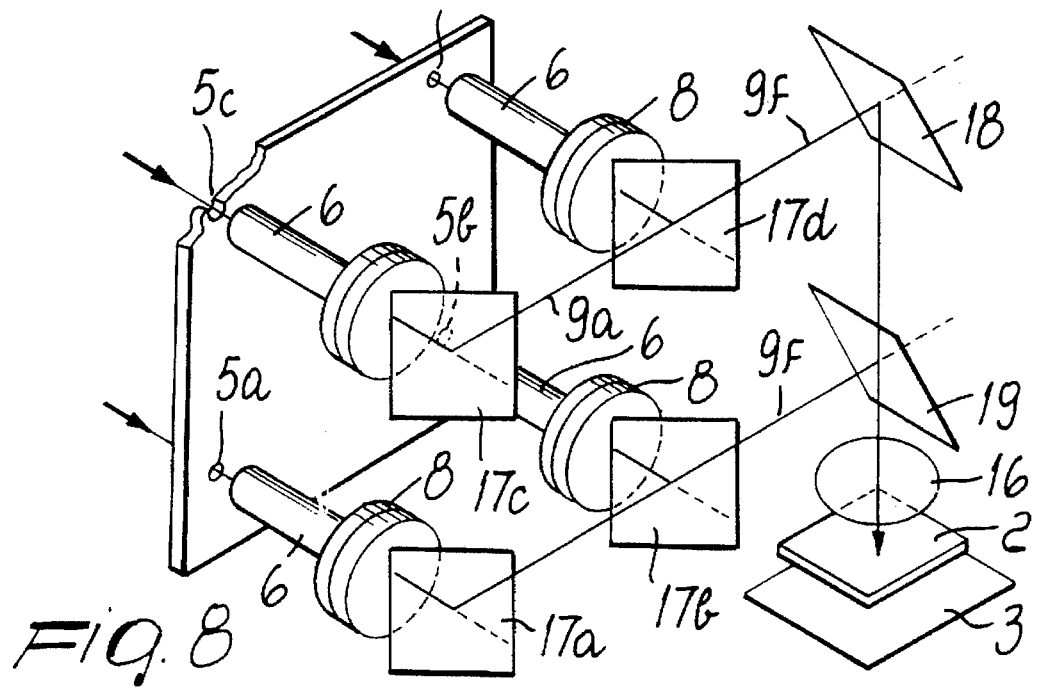

INTERFERENTIAL MULTISTEREOSCOPIC CAMERA WITH THREE-DIMENSIONAL EFFECT

BACKGROUND OF THE INVENTION

This is a continuation of application Ser. No. 08/194,966, filed on Feb. 14, 1994, now abandoned.

The present invention relates to an interferential multistereoscopic camera with three-dimensional effect.

SUMMARY OF THE INVENTION

The aim of the present invention is to provide a camera which can take two or more pictures of the same subject, and therefore pictures which are very slightly different from each other, and merge them into a single, virtually three-dimensional picture which does not require auxiliary means, such as colored lenses or anaglyphs, polarizers and the like, to be perceived as such.

An object of the present invention is to obtain a photograph with a three-dimensional optical effect similar to that of holograms but with a single perspective, with vertical and horizontal parallax, and usable in white light.

This aim, this and other objects are achieved by a camera provided with a lens, a diaphragm and a high-resolution photographic film or plate arranged behind the diaphragm and located on a plane which is normal to the optical axis of the lens, characterized in that said lens comprises at least two light inlets, a doublet or triplet for each light inlet, suitable for collimating the incoming light and for correcting any aberrations, and a merging system suitable for merging the homologous light rays from the doublets or triplets before they reach the photographic film or plate.

According to a structurally very simple embodiment, the merging system comprises at least two mirrors, each of which is struck by the light which arrives from a respective light inlet, one mirror being located along the path of the light reflected by the other mirror in order to merge homologous rays arriving both from the other mirror and from the respective doublet or triplet and to direct them either directly onto the film or toward at least one other mirror.

According to another embodiment of the camera according to the invention, the lens comprises: at least two light inlets or stenopaic holes; a self-focusing optical fiber for each stenopaic hole, arranged to receive and transmit the light arriving from the respective stenopaic hole, a doublet or triplet for each optical fiber, suitable for correcting any aberrations and for collimating the light arriving from the respective optical fiber, and a merging system, which comprises at least one Schlieren means capable of progressively deflecting the light rays or beams that leave the triplets until they are directed parallel to the said optical axis before they reach the photographic film.

The merging system can comprise a first light deflection portion, which is formed by a pack of plane-parallel plates, which have a refraction index which increases progressively in the direction of light propagation, a second light deflection portion, which is coupled to the first one and is constituted by a Schlieren means whose refraction index is higher than that of the last plane-parallel plate of the pack, so that the incident light rays or beams are progressively deflected until they are parallel to the said optical axis, and a converging meniscus, which has an anamorphic function, and a lens for opening out the outgoing light beam disposed between the merging system and the diaphragm.

Advantageously, the inlets comprise stenopaic holes arranged so that they are angularly spaced along a circumference which is concentric with respect to the lens axis, and each self-focusing optical fiber is tilted toward the lens axis in order to direct the light toward the respective doublet or triplet and toward the merging system with a relatively low angle of incidence.

BRIEF DESCRIPTION OF THE DRAWINGS

Further aspects and advantages of the present invention will become apparent from the description of two practical embodiments thereof, given with reference to the accompanying drawings, wherein:

FIG. 2 is an enlarged-scale view of a detail of FIG. 1, related to the acquisition of a picture through a stenopaic hole and a self-focusing optical fiber;

FIG. 3 is a schematic enlarged-scale view of a detail of FIG. 1, related to the use of an apochromatic triplet between a flexed self-focusing optical fiber and the merging system;

FIG. 4 is an enlarged-scale front elevation view of a merging system of the camera of FIG. 1;

FIG. 5 is a schematic elevation view of another embodiment of the camera according to the invention, provided with a mirror-based merging system;

FIG. 6 is an enlarged-scale view of a detail of a variation of FIG. 5;

FIG. 7 is a bottom view of FIG. 5, with some components shown in phantom lines;

FIG. 8 is a perspective schematic view of the camera of FIGS. 5 and 7; and

FIG. 9 is a perspective view of a detail of FIG. 8 showing a modification.

DETAILED DESCRIPTION OF THE PREFERRED EMBODIMENTS

Figure 1:
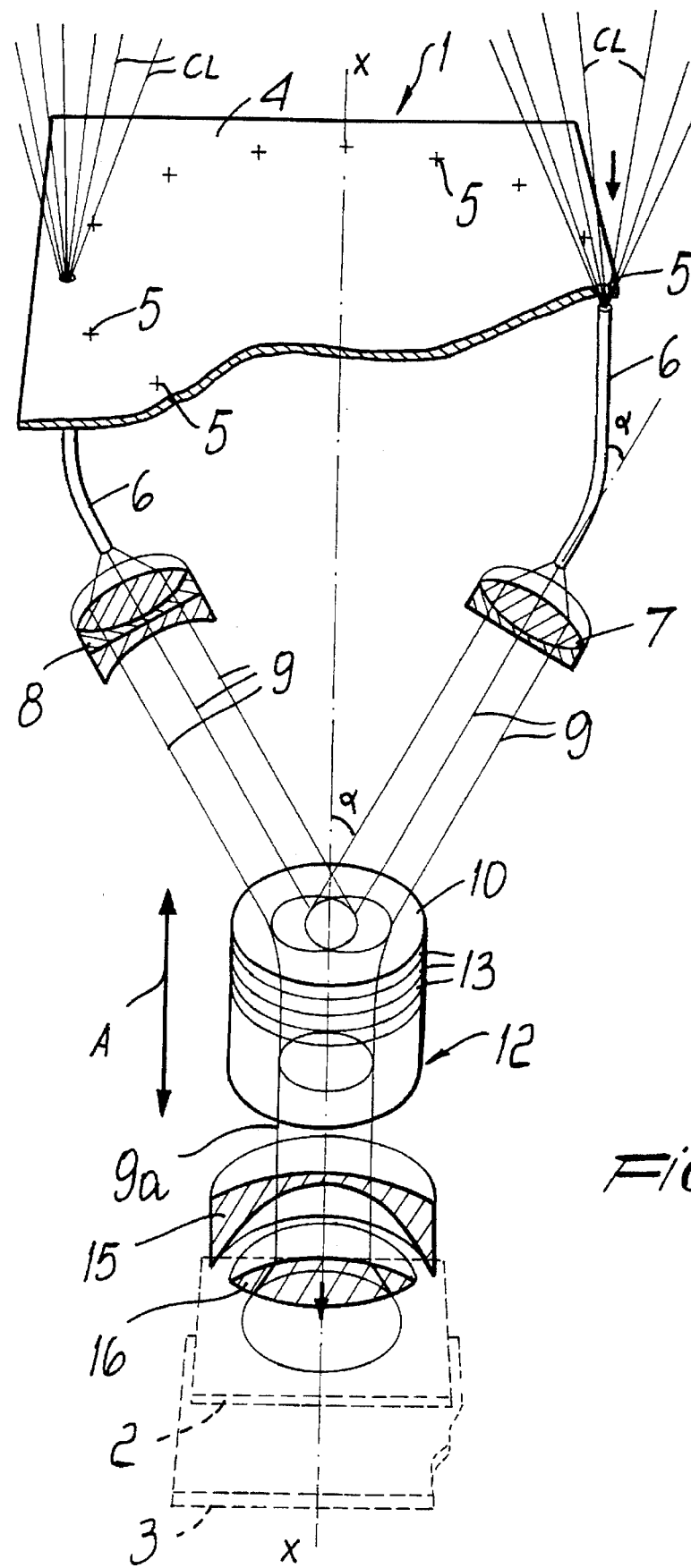
FIG. 1 is a simplified schematic view of an interferential multistereoscopic camera with three-dimensional effect equipped with a merging system constituted by a pack of plane-parallel plates and by a Schlieren means.

In the accompanying drawings, identical or similar components have been designated by the same reference numerals.

With reference to the embodiment shown in FIGS. 1 to 4, it can be seen that a camera according to the present invention comprises a compound lens, generally designated by the reference numeral 1, a diaphragm 2 and a hologram element 3 in the form of a hologram film or plate, all of which are arranged in sequence along an optical axis x—x.

The compound lens 1 comprises a flat opaque screen 4 in which a plurality of stenopaic holes 5 are formed. The stenopaic holes are arranged so that they are uniformly angularly spaced along a circle centered on the optical axis x—x. As more clearly shown in FIG. 2, each hole 5 is associated, on the internal side of the screen, with a respective optical fiber 6 which is of the self-focusing type, i.e. provided with a parabolic refraction index and is also known in the art as "Selfoc" fiber. The self-focusing optical fibers 6 are all identical and meant to receive light rays CL which arrive from a respective hole 5 and to transmit the light to an achromatic doublet 7 or to an apochromatic triplet 8 (only two of which are shown in FIG. 1).

It can be seen that the fibers 6 are all flexed toward the optical axis x—x by an angle α which is equal for example to 5°30".

The doublets 7 or the triplets 8, in addition to correcting any aberrations, convert the cone of sinusoidal light arriving from the respective optical fibers 6 into rays 9 which are parallel to the optical axis of the doublet or triplet. The said axis is inclined by an angle equal to α with respect to the optical axis x—x.

The parallel rays or beams 9 are directed onto the flat surface 10 of a system 12 for merging homologous rays, which is constituted by a first portion, formed by a plurality of plane-parallel plates 13, each of which has a refraction index which rises progressively starting from the incidence face 10 toward the flat exit surface 14, i.e. increases in the direction of advancement of the light rays 9. For example, the portion 13 can be constituted by a pack of four plane-parallel lenses or plates which respectively have a refraction index equal to 1.0–1.5–2.0–2.5. By virtue of the refraction gradient of the pack of plane-parallel plates 13, the light rays undergo a progressive deflection until they become aligned substantially parallel to the optical axis x—x.

The portion 13 is coupled to a second portion 14 which is constituted by a Schlieren means or medium which has a higher refraction index gradient, for example comprised between 2.5 and 6.0. It is meant to complete the deflection of the light rays until they are aligned, in a perfectly parallel manner, with the optical axis x—x.

In order to ensure optimum merging of homologous rays, the merging system 12 can be provided so that it can be moved backward and forward (as indicated by the arrow A) along the optical axis x—x by any suitable means, so that it can be moved into the position in which substantially all the homologous rays CL which have entered through the stenopaic holes 5, have been carried and deflected by the Selfoc fibers 6, have passed through the doublets 7 or the triplets 8 and are incident on the planar face 10 of the merging system 12, merge into a single ray or beam, generally designated by the reference numeral 9a, which contains a number of distinct and interfering information elements equal to the number of inlet stenopaic holes 5.

However, the merged rays 9a have an elliptical cross-section, since they are incident at an angle different from 90° on the flat face 10. Therefore, they are directed onto a converging meniscus 15 which has an anamorphic function and onto a lens 16 for opening out the beam before it passes through the diaphragm 2 and reaches the hologram element 3 to expose it. According to the preferred embodiment, the hologram element 3 is constituted by a hologram plate, preferably a high-resolution plate treated in accordance with the Lipmann method.

The light that strikes the emulsion of the hologram plate is reflected by the reflecting bottom layer of the plate and re-exposes, so to speak, the plate. The light beams, both the incident ones and the reflected ones, thus travel in directions which form an angle and in almost opposite directions, so that they are subjected to interference. This occurs even if the source emits a wide spectrum of wavelenghts, since the difference between the optical paths of the two beams (the incident one and the reflected one) is extremely small (almost nil).

One thus obtains an interferential multistereoscopic image with three-dimensional effect, similar to that of a hologram, but with a single perspective, owing to the fact that the emission of the stationary wave generated by virtue of the Lipmann method is used instead of the reference beam required to obtain holograms.

A similar result is also achieved with a camera such as the one shown in FIGS. 5 to 9, which comprises two or four stenopaic holes (FIGS. 5, 8 and 9) or lenses (FIG. 6) 5a,5b,5c and 5d, each one of which carries the light arriving from the object to be photographed toward an apochromatic triplet 8 which corrects any aberrations and collimates the light beam 9 before it reaches a respective mirror 17a,17b, 17c and 17d whose position can be adjusted, as shown by the arrow B.

Advantageously, between the stenopaic holes or lenses 5a,5b,5c and 5d and the triplets 8 it is possible to provide a respective self-focusing optical fiber 6 which constitutes a lightguide capable of improving the quality of the collimation produced by the triplets 8.

The mirrors 17a and 17c are ordinary or semitransparent mirrors, inclined for example at 45° with respect to the direction of the collimated rays 9, so as to direct the reflected rays 9a against a respective semitransparent mirror 17b and 17d which is also inclined with respect to the rays 9a by the same angle of inclination as the respective mirror located upstream. The rays 9a, in passing through the semitransparent mirrors 17b and 17d, merge with the homologous rays 9 which arrive from the lenses 5b and 5d to produce merged or compound rays 9f. The rays 9f that arrive from the pair of mirrors 17c and 17d are directed onto an ordinary or semitransparent mirror 18 which reflects them and directs them toward a semitransparent mirror 19 which has the same inclination as the mirror 18 and is meant to reflect the rays 9f which arrive from the pair of mirrors 17a and 17b. At the semitransparent mirror 19, the homologous rays reflected by the mirror 18 recombine or merge with those arriving from the pair of mirrors 17a and 17b, so that the rays or beams 9c that arrive from the mirror 19 are a merging of all the rays arriving from the light inlets of the lens and can be directed, through a biconvex lens 16 and the diaphragm 2, onto hologram element 3 in the form of a high-resolution photographic film or plate to expose it. In this embodiment, merging of the rays 9 occurs a first time at the semitransparent mirrors 17b and 17d and is completed at the semitransparent mirror 19 before the light rays reach the hologram element 3 to expose it and to obtain, in this case as well, a single-perspective photograph with three-dimensional optical effect, obtained by virtue of the emission of a stationary wave reflected by the back layer of the high-resolution photographic film or plate used, which is treated in accordance with the Lipmann method.

As can be easily understood, the mirror 17a might be orientated so as to direct the light rays which it reflects toward the mirror 17d, and the mirror 17c can direct the light rays which it reflects onto the mirror 17b, in which case the mirrors 17d and 17b are not semitransparent, obtaining the same result.

If the mirrors 17a and 17c are ordinary, i.e. non-semitransparent mirrors, then their respective stenopaic hole 5 should be relatively smaller and arranged in such a way as to be adjustable in position, e.g. by being slideably mounted in the screen 4 (as shown in FIG. 9—arrow W).

Naturally, the screen 4 in the above described embodiments may be movable with respect to the optical fibers 6 or to the doublets or triplet 8 to allow to change the "focus". Furthermore, as shown by the arrows B in FIG. 5, the mirrors 17a,17b,17c and 17d can be provided so that they are mutually movable, for example in a direction at 45° to the direction of the rays 9, to ensure the point-like and precise merging of the rays.

Moreover, by using a Lipmann's projection system it is also possible to make use of a film or plate 3 exposed in a camera as described above in order to obtain a three-dimensional motion-picture arrangement.

I claim:

1. A camera provided with a compound lens and a diaphragm, the compound lens having an optical axis, the camera being adapted for receiving a hologram element in the form of one of a hologram film and a hologram plate for arrangement behind the diaphragm so as to be located on a plane which is normal to the optical axis of the compound lens, wherein said compound lens comprises:

a portion including a zone which does not transmit light and a distinct number of light inlets which transmit light;

a selected one of a doublet and a triplet for each light inlet of said light inlets adapted for collimating incoming light and for correcting any aberrations thereby providing a distinct number of homologous light rays; and a merging system adapted for merging all the homologous light rays which leave the selected one of a doublet and a triplet for each light inlet into a single beam before the homologous light rays reach said plane of arrangement of said hologram element.

2. A camera according to claim 1, wherein said merging system comprises a distinct number of mirrors comprising for each light inlet of said light inlets a mirror for receiving light arriving from the respective light inlet, at least one of said mirrors being arranged on a path of light reflected by at least one other mirror of said mirrors and said at least one of said mirrors being semitransparent in order to merge light beams arriving both from said at least one other mirror and from the respective selected one of a doublet and a triplet for the light inlet of said at least one mirror and to direct merged rays onto a selected one of at least one other mirror and said hologram element.

3. A camera according to claim 1, wherein each light inlet of said light inlets comprises a lens device.

4. A camera according to claim 1 further comprising at least one biconvex lens arranged upstream of the diaphragm with respect to a direction of light propagation.

5. A camera according to claim 1, wherein each of said light inlets comprises one of a stenopaic hole and a lens device.

6. A camera provided with a compound lens and a diaphragm, the compound lens having an optical axis, the camera being adapted for receiving a hologram element in the form of one of a hologram film and a hologram plate for arrangement behind the diaphragm so as to be located on a plane which is normal to the optical axis of the compound lens, wherein said compound lens comprises:

a distinct number of light inlets;

a selected one of a doublet and a triplet for each light inlet of said light inlets adapted for collimating incoming light and for correcting any aberrations thereby providing a distinct number of homologous light rays; and a merging system adapted for merging all the homologous light rays which leave the selected one of a doublet and a triplet for each light inlet into a single beam before the homologous light rays reach said plane of arrangement of said hologram element;

and wherein said light inlets are stenopaic holes.

7. A camera according to claim 6, wherein a self-focusing optical fiber is provided between each light inlet and the respective selected one of a doublet and a triplet.

8. A camera provided with a compound lens and a diaphragm, the compound lens having an optical axis, the camera being adapted for receiving a hologram element in the form of one of a hologram film and a hologram plate for arrangement behind the diaphragm so as to be located on a plane which is normal to the optical axis of the compound lens, wherein said compound lens comprises:

a distinct number of light inlets mutually arranged about a center and each comprising one of a stenopaic hole and a lens device;

a selected one of a doublet and a triplet for each light inlet of said light inlets adapted for collimating incoming light and for correcting any aberrations thereby providing a distinct number of homologous light rays;

a merging system adapted for merging all the homologous light rays which leave the selected one of a doublet and a triplet for each light inlet into a single beam before the homologous light rays reach said plane of arrangement of said hologram element; and a self-focusing optical fiber for each light inlet of said light inlets adapted to receive and light arriving from the respective light inlet and transmit light to the selected one of a doublet and a triplet for each light inlet;

and wherein said merging system comprises at least one Schlieren means capable of progressively deflecting light rays leaving the selected one of a doublet and a triplet for each light inlet until the light rays are directed parallel to the optical axis before reaching said plane of arrangement of said hologram element.

9. A camera according to claim 8, wherein said merging system comprises:

a first light deflection portion formed by a pack of plane-parallel lenses with a refraction index for each lens which increases progressively in a direction of light propagation;

a second light deflection portion coupled to the first light deflection portion and comprising said Schlieren means which has a higher refraction index than a last plane-parallel lens of the pack, so that the incident light rays are progressively deflected until they are parallel to the optical axis; and a converging meniscus having an anamorphic function and a lens for focusing outgoing light beams, the converging meniscus being arranged between the merging system and the diaphragm.

10. A camera according to claim 8, wherein said light inlets are arranged so that they are spaced angularly along a circle which is concentric to the optical axis of the compound lens, and wherein each self-focusing optical fiber is inclined toward the optical axis to direct light toward the respective selected one of a doublet and a triplet for each light inlet and toward the merging system.

11. A camera according to claim 8, wherein said merging system comprises two mutually coupled Schlieren means.

* * * * *